US008191223B2

(12) United States Patent
Mobley

(10) Patent No.: US 8,191,223 B2
(45) Date of Patent: Jun. 5, 2012

(54) SNOWMOBILE TRACK CLIPPING TOOL

(76) Inventor: Stephen J. Mobley, Oxford, MI (US)

( * ) Notice: Subject to any disclaimer, the term of this patent is extended or adjusted under 35 U.S.C. 154(b) by 557 days.

(21) Appl. No.: 12/405,529

(22) Filed: Mar. 17, 2009

(65) Prior Publication Data

US 2010/0236061 A1 Sep. 23, 2010

(51) Int. Cl.
*B21D 39/00* (2006.01)
*B23P 11/00* (2006.01)

(52) U.S. Cl. ........... 29/505; 29/513; 29/243.56; 72/412; 72/416; 72/453.16

(58) Field of Classification Search .................... 29/505, 29/509, 513, 243.56, 816, 283.5; 72/407, 72/412, 416, 452.8, 452.9, 453.03, 453.16
See application file for complete search history.

(56) References Cited

U.S. PATENT DOCUMENTS 1,653,827 A 12/1927 Trimble
1,720,133 A * 7/1929 Le Roy .......................... 72/403
3,427,837 A * 2/1969 Faulconer ...................... 72/19.7
3,772,907 A * 11/1973 Rider .............................. 72/412
3,851,371 A 12/1974 Plunkett
3,972,218 A * 8/1976 Pawloski ........................ 72/407
4,109,504 A * 8/1978 Rommel ......................... 72/407
4,227,395 A * 10/1980 Plavsity .......................... 72/402
4,261,089 A 4/1981 Taylor
4,261,090 A 4/1981 De Boer
4,558,584 A 12/1985 Myers
4,630,459 A * 12/1986 Elliott ............................ 72/307
5,125,296 A 6/1992 Nelson et al.
5,415,470 A 5/1995 Courtemanche
5,887,327 A 3/1999 Erickson
6,070,449 A 6/2000 Vachon
6,119,502 A 9/2000 Buchmayer
6,164,106 A * 12/2000 Nghiem et al. ................ 72/20.1
6,386,532 B1 5/2002 Donovan et al.
6,516,988 B2 2/2003 Bergeron et al.
6,530,626 B1 3/2003 Benoit et al.
6,994,284 B1 * 2/2006 Ramun ......................... 241/266
7,290,431 B1 11/2007 Spivak
7,434,441 B2 10/2008 Frenken
7,464,578 B2 * 12/2008 Ayer et al. .................. 72/453.15
2002/0148877 A1 10/2002 Bergeron et al.
2004/0010899 A1 1/2004 Winterhalter et al.

* cited by examiner

*Primary Examiner* — Essama Omgba
(74) *Attorney, Agent, or Firm* — Warn Partners, P.C.; Gregory L. Ozga

(57) ABSTRACT

A crimp tool and crimp arrangement for connecting a clip onto a snowmobile tread. The snowmobile tread and clip once connected together are positioned in cooperating engagement with the suspension of a snowmobile. The crimp tool implements a pneumatic actuator having a shaft with a transverse axle that is in operable engagement with bearing surfaces of the two press levers. The transverse axle causes the two press levers to pivot about pivot posts between a crimped and uncrimped position. When a clip for connection to the tread of the snowmobile is positioned between the crimp ends of the two press levers, the clip can be bent from an uncrimped position to a crimped position by the crimp ends, thereby connecting the clip to the tread of the snowmobile.

19 Claims, 3 Drawing Sheets

SNOWMOBILE TRACK CLIPPING TOOL

FIELD OF THE INVENTION

The present invention relates to a new and improved crimp tool arrangement for connecting a clip for snowmobile tread onto the track member.

BACKGROUND OF THE INVENTION

Snowmobile treads are normally provided with a series of sheet metal clips extending at spaced intervals in two separate rows or tracks positioned to engage the slide rails that are part of a snowmobile suspension system. When a snowmobile tread is assembled or replaced the clips have to be installed to the tracks formed in the snowmobile tread. This task is typically carried out by using hand tools to grasp the clip and bend them into crimped engagement with the snowmobile tread. Bending each clip requires a great deal of strength, precise hand tool alignment and a significant amount of time due to the large number of clips that must be connected. There is a need for a power tool designed for connecting the clips to the snowmobile tread which will save time and provide the precise alignment needed to connect the clip to the snowmobile tread.

SUMMARY OF THE INVENTION

The present invention relates to a crimp tool and clip arrangement for connecting the clip onto a snowmobile tread. The snowmobile tread and clip once connected together are positioned in cooperating engagement with the suspension of a snowmobile. The clip is crimped to the tread using a crimp tool having a tool housing that includes a crimp housing with an actuator connected to the tool housing. The actuator also includes a drive mechanism that extends into the crimp housing. The crimp housing contains two pivot posts each having a press lever pivotably connected to the two posts. The two press levers are positioned in the crimp housing such that the drive mechanism of the actuator is operably connected to the two press levers and moves the two press levers between a release position and a crimp position. The two press levers also each have a crimp end that extends outside of the crimp housing and pivot between the release position and the crimp position.

The clip has a bearing face and two bendable wings. Each of the two bendable wings is removably engaged to a respective crimp end of the two press levers. When the two press levers are engaged with the two wings the press levers are operable to move the two wings from an uncrimped position to a crimped position as the two levers are driven by the drive mechanism between the release position and the crimp position. Prior to moving the two wings to the crimped position the clip is placed relative to the snowmobile tread so that when the two wings are moved to the crimped position the clip is connected to the snowmobile tread through the crimped engagement.

BRIEF DESCRIPTION OF THE DRAWINGS

Preferred embodiments of the present invention will now be described, by way of example only, with reference to the attached Figure, wherein.

DETAILED DESCRIPTION OF THE INVENTION

Figure 1:
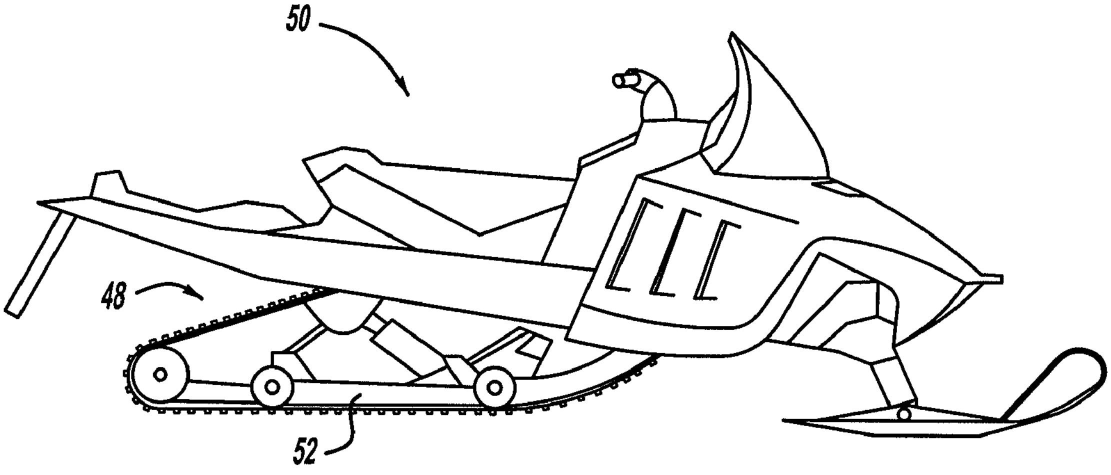
FIG. 1 is a side plan view of a snowmobile with the tread attached.
Figure 2:
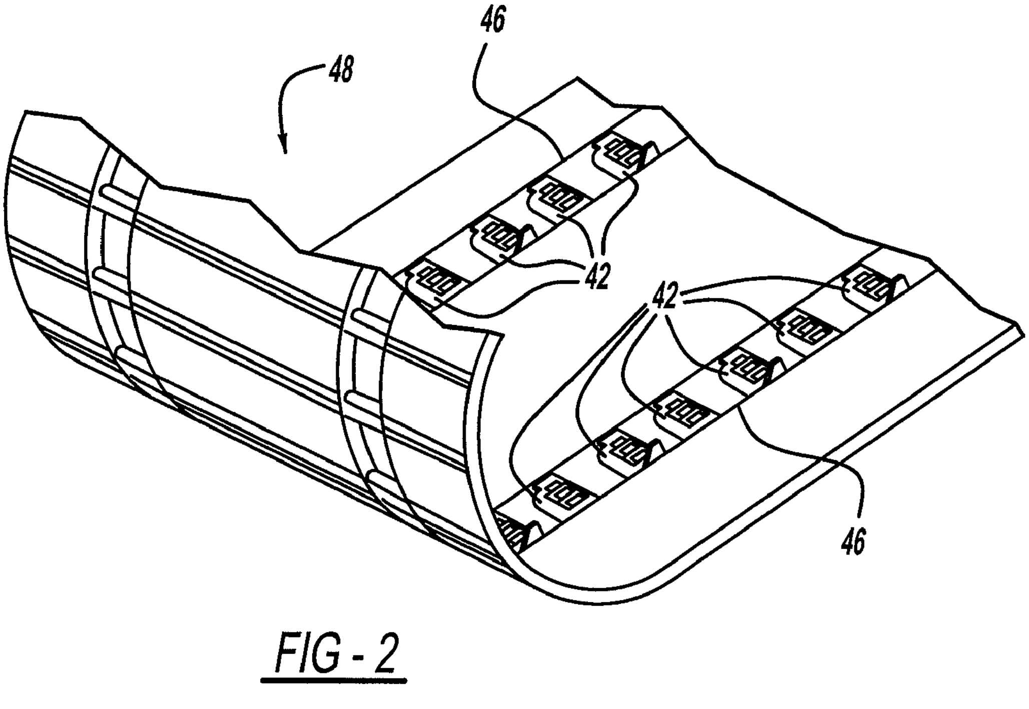
FIG. 2 is a partially broken away side perspective view of the snowmobile tread with the clips in position.
Figure 3:
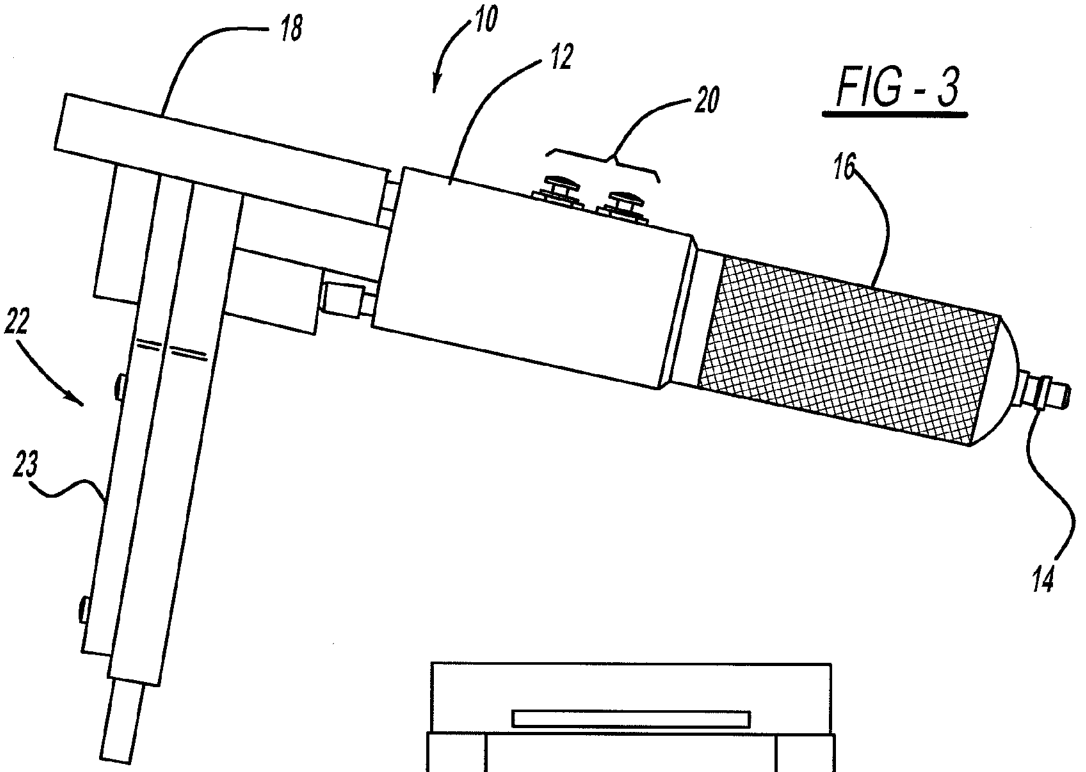
FIG. 3 is a side plan view of a crimp tool used for attaching the clips to the snowmobile tread.

Referring now to FIG. 3 a crimp tool 10 in accordance with one embodiment of the present invention is shown. The crimp tool 10 has a tool housing 12 that has an inlet 14 which is used to connect a power source for operating the crimp tool 10. The housing 12 also has a handle portion 16 that may have a textured surface to provide the user of the tool with a grip surface for holding the crimp tool 10.

The inlet 14 in the present embodiment of the invention is a high pressure air inlet port that is used to provide high pressure air to an actuator 18, which in this particular embodiment is a pneumatic actuator powered by high compressed air from the inlet 14. The high pressure gas is provided by a compressor or compressed air cylinder or other suitable source. In an alternate embodiment of the present invention, the actuator 18 is an electric motor and the inlet 14 can be a location where an electric power source can be plugged into.

The tool housing 12 also includes one or more actuator buttons 20 for controlling the operation of the actuator 18. The one or more actuator buttons 20 can include a single button that causes the actuator 18 to function in a single direction and then when the button is released the actuator 18 will automatically move in the opposite direction; or a second actuator button can be implemented to cause the actuator to move in a opposite direction than the first actuator button. For example, in the present embodiment of the invention there can be one actuator button to cause the actuator 18 to move to a crimp position and a second actuator button to cause the actuator 18 to move to a release position. In another exemplary embodiment of the present invention a single actuator button is used to control the movement of the actuator 18 to the crimped position. When the single button is released the actuator automatically moves back to the release position.

The tool housing 12 also has a crimp housing 22 that is either separate from or integrally formed with the tool housing 12. The crimp housing 22 optionally includes a removable cover 23 that provides access to the components contained therein.

Figure 4:
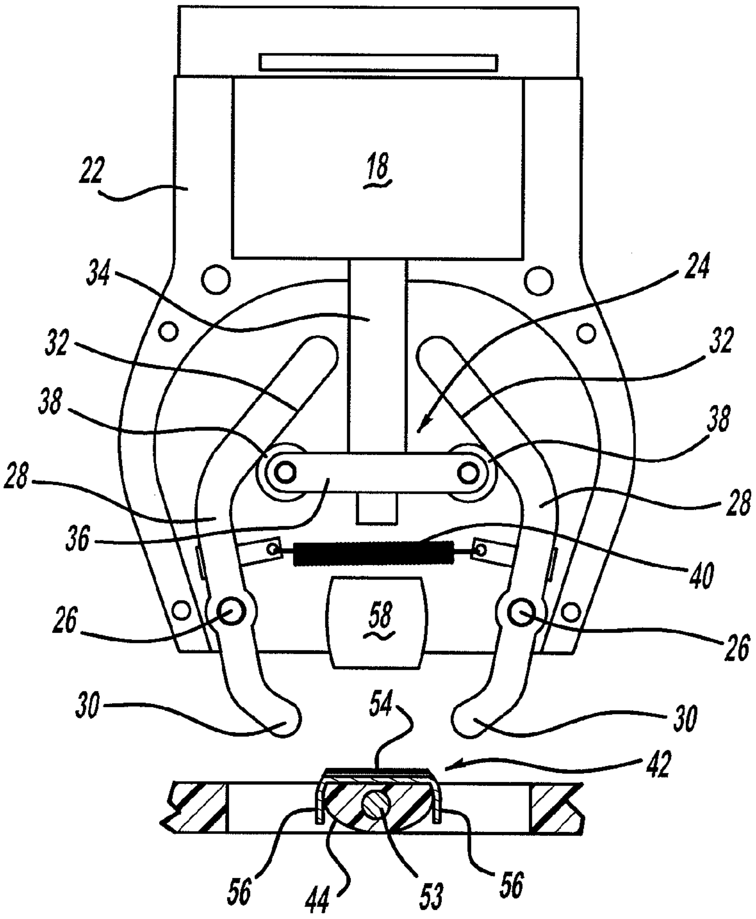
FIG. 4 is a side plan view of the crimp housing of the crimp tool with the cover removed and a cross-sectional side plan view of the clip member and attachment surface with the clip member in the uncrimped position.
Figure 5:
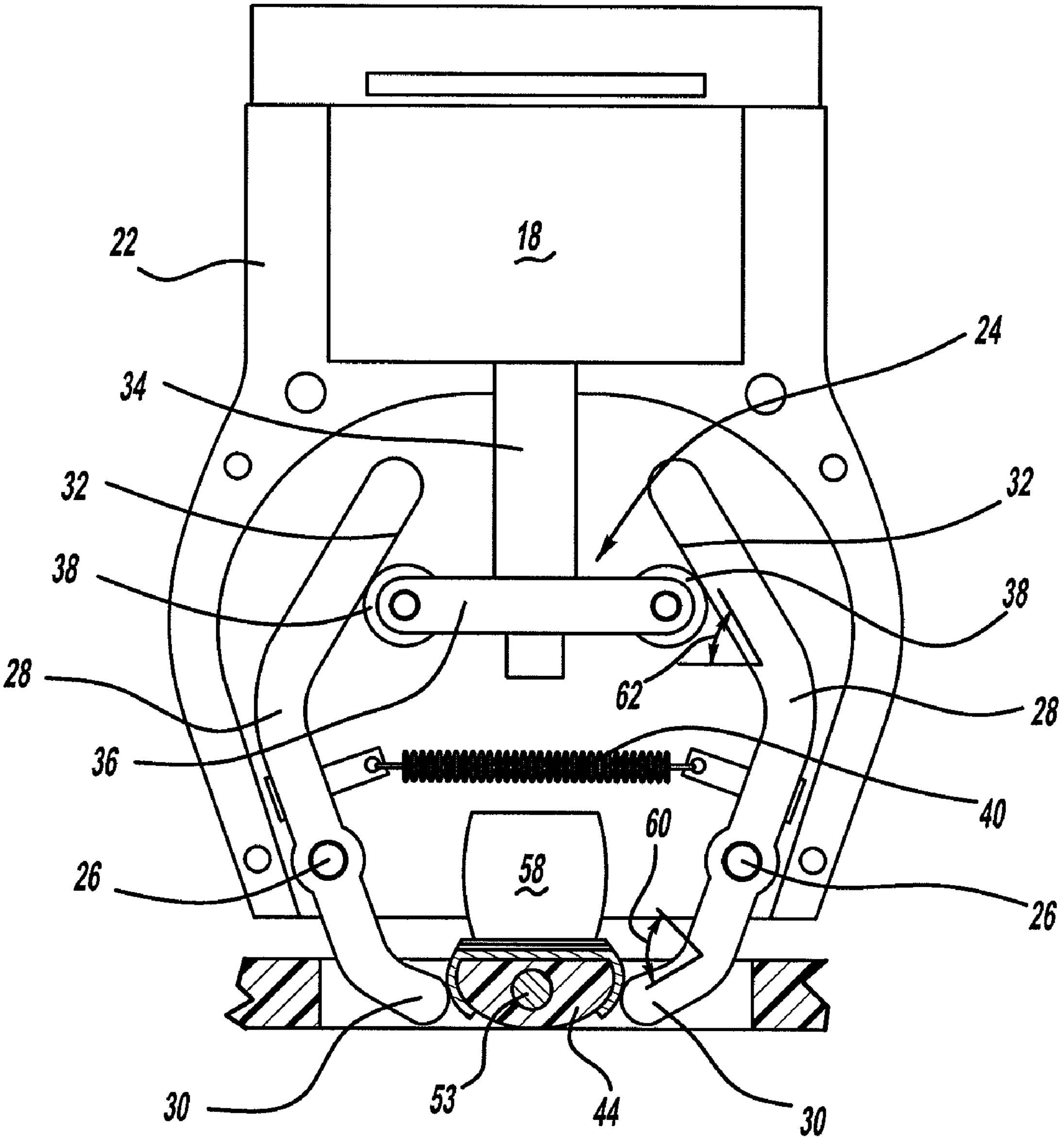
FIG. 5 is a side plan view of the crimp housing of the crimp tool with the cover removed and a cross-sectional side plan view of the clip member and attachment surface with the clip member in the crimped position.

Referring now to FIGS. 4 and 5, the actuator 18 has a drive mechanism 24 that extends into the crimp housing 22. Within the crimp housing 22 are two pivot posts 26 that extend from the surface of the crimp housing 22. While this particular embodiment of the invention describes two pivot posts 26, it is possible to use additional pivot posts if necessary. Pivotally connected to each of the two pivot posts 26 is a single press lever 28 which is also referred to herein as the two press levers 28. Each of the two press levers 28 has a crimp end 30 that extends outside of the crimp housing 22.

The two press levers 28 also each have bearing ramp portions 32. The drive mechanism 24 of the actuator 18 includes an actuator shaft 34 that extends into the crimp housing 22 and between the bearing ramp portions 32 of the two press levers 28. Connected to the actuator shaft 34 is a transverse post 36 of the drive mechanism 24 that has a roller bearing 38 rotatably connected to each end of the transverse post 36.

While this particular embodiment of the invention discloses a single roller bearing 38 positioned on each end of the transverse post 36, it is possible for multiple roller bearings to be used. The roller bearings 38 are operably configured to contact one of the bearing ramp portions 32 on one of the two press levers 28. Upon activation of the actuator 18 the actuator shaft 34 moves toward the actuator 18 causing the roller bearings 38 of the transverse post to slide, upward with respect to FIGS. 4 and 5, and cause the two press levers 28 to pivot about the pivot post 26 away from each other. Simultaneously the crimp ends 30 of the two press levers 28 pivot toward each other. When the actuator 18 is deactivated or moved to the release position the transverse post 36 will move downward with respect to FIGS. 4 and 5, causing the bearing ramp portions 32 of the two press levers 28 to pivot toward each other about the pivot posts 26. The movement of the two press levers 28 to the release position is further facilitated by the biasing action of a return spring 40 which is connected between the two press levers 28 and is tensioned when the two press levers 28 move to the crimped position.

Referring now to all of the figures, the crimp tool 10 described above is used to connect a clip 42 for a raised attachment surface 44 found on a track 46 that is part of a tread 48 of a snowmobile 50. The snowmobile 50 uses the tread 48 in order to move the vehicle along its surface. The tread 48 is operably connected to the snowmobile 50 in part by way of a rail 52 upon which the tread 48 slides on. The inside surface of the tread 48 has a track 46 running along its inside surface. The tread 48 has two tracks 46, and it is within the scope of this invention to have one or more tracks 46 for a given tread. The number of tracks included on a tread depends upon the type of snowmobile 50. Along the length of each track 46 are one or more raised attachment surfaces 44. Each attachment surface 44 also optionally has a steel reinforcement rod 53 extending transversely through the raised attachment surface 44 and imbedded within the material of the tread 48. Each raised attachment surface 44 has a clip 42 crimped thereon which cooperates with the rail 52 of the snowmobile 50 to facilitate the sliding of the tread 48 relative to the rail 52. During assembly or repair of the tread 48 to the snowmobile 50, each clip 42 is crimped onto the attachment surface 44.

In accordance with the present embodiment of the present invention the crimp tool 10 is used to provide a power driven arrangement for crimping the clip 42 to its respective attachment surface 44. Each clip 42 has a bearing surface 54 and at least two wings 56 that are bendable from an uncrimped position to a crimped position. The clips 42 are typically formed out of metal such as steel; however, it is within the scope of this invention for the clips 42 to be formed of other materials such as durable plastic. During operation of the crimp tool 10 a clip 42 is placed relative to the crimp housing 22 such that the two wings 56 of the clip 42 are operatively aligned with the crimp ends 30 of the two press levers 28. At this point the crimp ends 30 are in an uncrimped position and are far enough apart to allow the clip 42 to be aligned relative to the crimp housing 22. Additionally it is also possible for the crimp housing 22 to include a guard 58 that is used to rest the bearing surface 54 of the clip 42 against the guard 58 to ensure alignment of the crimp ends 30 relative to the wings 56. When the actuator button 20 is pressed to cause the actuator 18 to move from the release position to a crimp position, the actuator shaft 34 moves upward to cause the transverse post 36 and roller bearings 38 to slide along the bearing ramp portions 32. This causes the crimp ends 30 to pivot toward each other and bend the wings 56 toward each other allowing for the wings to crimp around the attachment surface 44 of the track 46.

In another aspect of the present invention the crimp ends 30 each have an angle 60 selected between 1° and 89°, where the lower the angle of the inclination of the crimp end 30 the greater the crimp force of the crimp end 30 as the two press levers 28 are moved between the release position and crimp position. Additionally the angle 60 of the crimp ends 30 may be different depending upon the shape of the wings 56 for a given clip 42. For example, some clips 42 may have longer wings or wings that are at a greater inclination, thus a different type of press lever 28 having a different angle 60 on its crimp ends 30 might be desired.

In another aspect of the present invention the bearing ramp portions 32 of the two press levers 28 have an angle 62 selected between 1° and 89° where the lower the angle 62 of inclination of the bearing ramp portions 32 the greater the crimp force of the crimp ends 30 as the drive mechanism 24 moves between the release position and the crimp position. Thus if it is desirable to have a greater force through a given crimp operation then different press levers having different bearing surface angles can be selected.

The above-described embodiments of the invention are intended to be examples of the present invention and alterations and modifications may be effected thereto, by those of skill in the art, without departing from the scope of the invention which is defined solely by the claims appended hereto.

I claim:

1. A crimp tool and clip arrangement for connecting the clip onto a snowmobile tread for cooperating with a snowmobile suspension comprising:

a tool housing including a crimp housing;

an actuator connected to said tool housing and having a drive mechanism extending into said crimp housing;

two pivot posts in said crimp housing;

two press levers each having a crimp end extending out of said crimp housing, each of said two press levers being pivotally coupled to one of said two pivot posts such that said drive mechanism is operably connected to said two press levers for moving said two press levers between a release position and a crimp position;

a clip having a bearing surface with two bendable wings each removably engaged to a respective crimp end of said two press levers, wherein the two press levers when engaged with the two wings move the two wings between an uncrimped position and a crimped position as said two levers are driven by said drive mechanism between said release position and said crimp position, thereby connecting the clip to the snowmobile tread;

a handle portion of said tool housing to provide a user with a grip surface for holding the crimp tool in precise alignment needed to connect said clip to said snowmobile tread; and, an actuator shaft extending from said actuator into said crimp housing, a transverse shaft connectable to said actuator shaft and a roller bearing connected to each end of said transverse shaft removably engaging a respective one of a bearing ramp portion of each of said two levers.

2. The arrangement of claim 1 wherein said drive mechanism further comprises:

a actuator shaft extending from said actuator into said crimp housing, a transverse shaft connectable to said actuator shaft and a roller bearing connected to each end of said transverse shaft for movably engaging one of said two press levers.

3. The arrangement of claim 1 wherein said actuator is a pneumatic actuator connected to said tool housing and said crimp housing and said crimp housing has a cover and body, wherein said cover is removable to access a portion of said pneumatic actuator.

4. The arrangement of claim 1 further comprising a guard formed on the crimp housing for contacting said bearing surface of said clip to ensure alignment of each said respective crimp end with said two wings.

5. The arrangement of claim 1 further comprising a return spring extending between and connected to said two press levers, wherein said return spring is tensioned when the two press levers are moved to the crimp position so that the press levers are biased by the return spring to the release position when the drive mechanism is not moving said two press levers to said release position.

6. The arrangement of claim 1 wherein said crimp ends have an angle selected between 1° and 89°, where the lower the angle of the inclination of the crimp end, the greater the crimp force of said crimp ends as said two press levers are moved between said release position to said crimp position.

7. The arrangement of claim 1 further comprising one or more actuator buttons on said tool housing, wherein said one or more actuator buttons are operably connected to said actuator for controlling the movement of said drive mechanism and said two press levers between said release position and said crimp position.

8. The arrangement of claim 1 wherein said snowmobile tread further comprises one or more tracks having a raised attachment surface with a steel reinforcement rod, wherein said two wings of said clip are bent into engagement with said raised attachment surface when in said crimp position.

9. A crimp tool and clip arrangement for connecting the clip onto a snowmobile tread for cooperating with a snowmobile suspension comprising:

a tool housing including a crimp housing;

an actuator connected to said tool housing and having a drive mechanism extending into said crimp housing;

two pivot posts on said crimp housing;

two press levers each having a crimp end extending out of said crimp housing each pivotally coupled to one of said two pivot posts and capable of moving between a release position and a crimp position;

each of said two press levers having a bearing ramp portion wherein said drive mechanism moves along said bearing ramp portion causing said two press levers to move between said release position and said crimp position;

a clip having a bearing surface with two bendable wings removably engaged to a respective crimp end of one of the press levers, wherein the two levers when engaged with the two wings move the two wings between an uncrimped position and crimped position as the two levers are driven by the drive mechanism between the release position and the crimp position connecting the clip to a snowmobile tread;

a handle portion of said tool housing to provide the user with a grip surface for holding said crimp tool in precise alignment needed to connect said clip to said snowmobile tread; and an actuator shaft extending from said actuator into said crimp housing, a transverse shaft connectable to said actuator shaft and a roller bearing connected to each end of said transverse shaft removably engaging a respective one of said bearing ramp portion of said two press levers.

10. The arrangement of claim 9 wherein the bearing ramp portions have a set angle of inclination selected between the range of 1° and 89°, where the lower the angle of inclination the greater the crimp force of the crimp ends as the driving mechanism moves along the bearing ramp portions.

11. The arrangement of claim 10 wherein said crimp ends have an angle selected between 1° and 89°, where the lower the angle of the inclination of the crimp end, the greater the crimp force of said crimp ends as said two press levers are moved between said release position to said crimp position.

12. The arrangement of claim 9 wherein said actuator is a pneumatic actuator connected to said tool housing and said crimp housing and said crimp housing has a cover and body, wherein said cover is removable to access a portion of said pneumatic actuator.

13. The arrangement of claim 9 further comprising a guard formed on the crimp housing for contacting said bearing surface of said clip to ensure alignment of each said respective crimp end with said two wings.

14. The arrangement of claim 9 further comprising a return spring extending between and connected to said two press levers, wherein said return spring is tensioned when the two press levers are moved to the crimp position so that the press levers are biased by the return spring to the release position when the drive mechanism is not moving said two press levers to said release position.

15. The arrangement of claim 9 wherein said crimp ends have an angle selected between 1° and 89°, where the lower the angle of the inclination of the crimp end, the greater the crimp force of said crimp ends as said two press levers are moved between said release position to said crimp position.

16. The arrangement of claim 9 further comprising one or more actuator buttons on said tool housing, wherein said one or more actuator buttons are operably connected to said actuator for controlling the movement of said drive mechanism and said two press levers between said release position and said crimp position.

17. The arrangement of claim 9 wherein said snowmobile tread further comprises one or more tracks having a raised attachment surface with a steel reinforcement rod, wherein said two wings of said clip are bent into engagement with said raised attachment surface when in said crimp position.

18. A method of attaching a clip to a snowmobile tread using a crimp tool providing a tool housing with a crimp housing, a handle portion of said tool housing, inlet port, pivot posts in the crimp housing, two press levers each having a crimp end and being pivotally coupled to the pivot posts, an actuator, one or more actuator buttons, an actuator shaft extending from said actuator into said crimp housing, a transverse shaft connectable to said actuator shaft and a roller bearing connected to each end of said transverse shaft removably engaging a respective one of a bearing ramp portion of each of said two levers; a clip with two bendable wings, a tread having a raised attachment surface, comprising the steps of:

placing said clip into position with respect to said attachment surface;

using said handle portion to allow a user to position said crimp tool in precise alignment needed to connect said clip to said snowmobile tread depressing said one or more actuator buttons causing the actuator to move said press levers from a release position to a crimp position, wherein said actuator moves said two press levers away from each other causing said two press levers to pivot about said pivot posts and said two crimp ends of said two press levers to move toward each other;

bending said wings of said clip to a crimped position.

19. The method of claim 18 further comprising the step of:

releasing said one or more actuator buttons and moving said actuator to a release position in response to the release of said one or more actuator buttons;

providing a return spring connected between said two press levers, wherein said return spring is tensioned when said two press levers are pivoted to a crimped position, thereby biasing said two press levers to move back to said uncrimped position when said actuator is moved to said release position.

* * * * *